US006453596B1

United States Patent
Marco

(10) Patent No.: US 6,453,596 B1
(45) Date of Patent: Sep. 24, 2002

(54) PROCEDURE FOR ELECTRO-STUNNING AND/OR ELECTRO-SACRIFICE, FOR INDUSTRIAL APPLICATION TO MARINE INCHTHYOLOGICAL SPECIES IN FLOATING CAGES

(75) Inventor: Garcia Martinez Marco, Mazarróon (ES)

(73) Assignee: Gines Mendez Espana, S.L., Murcia (ES)

( * ) Notice: Subject to any disclaimer, the term of this patent is extended or adjusted under 35 U.S.C. 154(b) by 0 days.

(21) Appl. No.: 09/604,487

(22) Filed: Jun. 27, 2000

(51) Int. Cl.[7] ............................................. A01K 79/02
(52) U.S. Cl. ...................... 43/4.5; 43/6; 43/6.5; 43/9.6; 43/17.1
(58) Field of Search ........................... 43/4, 4.5, 6, 6.5, 43/9.6, 17.1

(56) References Cited

U.S. PATENT DOCUMENTS

| | | | | | |
|---|---|---|---|---|---|
| 2,593,995 A | * | 4/1952 | Deskin et al. | .................... | 43/4 |
| 2,643,477 A | * | 6/1953 | Silva | ............................ | 43/6.5 |
| 2,667,814 A | * | 2/1954 | Blackmon | ........................ | 43/6 |
| 3,058,247 A | * | 10/1962 | Puretic | ........................ | 43/6.5 |
| 3,124,890 A | * | 3/1964 | Puretic | ........................ | 43/6.5 |
| 3,775,890 A | * | 12/1973 | Puretic | ........................ | 43/6.5 |
| 3,938,274 A | * | 2/1976 | Seymour | ...................... | 43/4.5 |
| 4,434,572 A | * | 3/1984 | Sheldon et al. | ............... | 43/6.5 |
| 4,551,938 A | * | 11/1985 | Sheldon et al. | ............... | 43/6.5 |
| 4,894,943 A | * | 1/1990 | Allen et al. | .................... | 43/6.5 |
| 5,214,873 A | * | 6/1993 | Sharber | ....................... | 43/17.1 |
| 5,289,133 A | * | 2/1994 | Kolz | .......................... | 43/17.1 |
| 5,644,863 A | * | 7/1997 | Verburg | ........................ | 43/9.6 |
| 5,778,591 A | * | 7/1998 | Oschman et al. | ............ | 43/17.1 |
| 5,943,806 A | * | 8/1999 | Underwood | ..................... | 43/6 |

FOREIGN PATENT DOCUMENTS

| | | | | | |
|---|---|---|---|---|---|
| FR | 997247 B1 | * | 9/1951 | ................... | 43/6.5 |
| JP | 2000-236778 B1 | * | 9/2000 | | |
| SU | 1009886 B1 | * | 4/1983 | ................... | 43/6.5 |
| SU | 1083996 B1 | * | 4/1984 | ................... | 43/6.5 |

* cited by examiner

Primary Examiner—Darren W. Ark
(74) Attorney, Agent, or Firm—Robert M. Schwartz

(57) ABSTRACT

Procedure for electro-stunning and/or electro-sacrifice, for industrial application to marine ichthyological species in floating cages having a floating cage (12) with tuna fish (6) two divers are introduced, the hunter (1), who uses a rifle with a harpoon with a Teflon head and metallic tip (4), joined to equipment for transforming electric potential (3) on the boat (7) and also connected to a plate (5) submerged and the controller (2) that activates the equipment (3), which sends an electric stunning signal or a signal that kills the fish (6) to the two terminals of the plate (5) and tip (4), the fish is lifted from the water by the crane (10), and equipped with a collar or identifying plastic label (11), the rifle and the harpoon are recovered towards the boat (7).

14 Claims, 1 Drawing Sheet

PROCEDURE FOR ELECTRO-STUNNING AND/OR ELECTRO-SACRIFICE, FOR INDUSTRIAL APPLICATION TO MARINE INCHTHYOLOGICAL SPECIES IN FLOATING CAGES

OBJECT OF THE INVENTION

The invention put forward here consists of an electro-stunning and/or electro-sacrifice procedure, mainly for industrial application to ichthyiological species in floating cages, from among those means of electro-stunning and/or electro-sacrifice of animal species.

This does not mean that it cannot be applied to any confinement structure, raising and fattening of fish, such as rigid cages, fixed bottom cages, cages formed by closing off bays, between islands, between island and coast, etc. as well as in fish nurseries on land, swimming pools, large aquariums, brooks and artificial lakes.

FIELD OF ACTIVITY

Independently of the possibility of extension of this technique to other ichthyiological species, preferably marine species, this process is basically designed for preferred application to fishes of the broad family of mackerel, such as all types of tuna fish, bonito, the sword fish, etc.

This does not mean that it cannot be used with other species of fish.

SCOPE OF THE INVENTION

In order to optimise the productivity during the sacrifice of the fish, to maintain the quality of the fish meat after this sacrifice and, finally, to maintain this quality in a controlled fashion a posteriori, this invention takes special advantage of floating cages for holding and fattening fish and, in general, it takes special advantage of any confinement system in which two divers, one a hunter and the other a controller can enter, who use a modified harpoon along with equipment for conversion of electrical potential, connected to a submerged plate to introduce an electrical signal into the fish that stuns or kills it.

Afterwards, the fish is equipped with an identification label recording all the incidences in the manipulation of the animal, recovering the harpoon with its corresponding rifle towards the boat.

BACKGROUND OF THE INVENTION

Currently the tuna fish are sacrificed from the boats by lifting the bottom of the floating cage and firing a shotgun or hitting them over the head with a club. This grouping of fish in a minimal vital space and the killing itself produce a high degree of stress and cause metabolic processes that alter the quality of the fish meat.

With regards to the alteration of the quality of the fish meat produced by stress before death, biochemical and physiological aspects should be considered.

Thus, most fish, as is the case for many animal species, show a reaction of maximum energy in the face of any stress, fright or danger, such as when they are withdrawn alive from the water. Normally, the reaction consists of changes in the heart rhythm; an increase in cortisol, adrenaline and noradrenaline production, as well as vigorous muscle contractions. These processes are stronger still when the fish fight for a long time against a slow death.

This effort depletes the oxygen reserves in the muscles, and so the normal aerobic glycolysis of glycogen sugar cannot take place to release energy resources in the form of ATP molecules. Therefore the muscles have to resort anaerobic glycolysis for the production of ATP. This process leads to an accumulation of lactic acid with a reduction in the pH of the muscles, and a drop in the energy resources thereof (glycogen and ATP).

The overall result of these effects is an acceleration in the autolytical spoliation in the cellular environment after death, which increases bacterial degradation.

Almost all the methods existing for capturing and sacrificing fish lead to greater or lesser stress levels and so different levels of reduction in the quality and consistency of the product are observed. When, after death, the fish is not cooled rapidly, the meat begins to soften and spoil with denaturing of the proteins, liquid loss, loss of the integrity of the muscular tissue, change of colour through diffusion of haemoproteins. On the other hand, the lipids are hydrolysed and oxidised.

Measurement of the pH in recently cut muscles provide reliable indications of the levels of lactic acid and stress suffered during the capture and sacrifice. If the pH is 7 or less this indicates that the fish has suffered from a lot of stress, which has led to the high levels of lactic acid.

The applicant is unaware of the existence of electro-stunning and/or electro-sacrifice in floating cages and confinement structures in general with the characteristics that will now be described.

DESCRIPTION OF THE INVENTION

When tackling the problem of exploitation of marine ichthyological species, such as the red tuns, *Thunnus Thynnus* (and also other ichthyoloigcal varieties and species), kept and fed in floating cages, in order to guarantee that good results are obtained for this activity, three indispensable aspects should be considered.

1) The need to guarantee the realisation of the sacrifice of the ichthyiological species, object of this exploitation, in conditions that guarantee that no biochemical, hormonal or mechanical or any other type of alteration that might lead to a reduction in the quality of the fish meat, reducing its economical value in the market, is produced in fish meat of said species.

2) The need that the chosen sacrifice system, with respect to the number of fish sacrificed per hour, guarantees a high productivity and, all this with the aim of reducing the processing time of the batch of tuna fish and, also, preventing the production costs from rising, keeping them within a level that competes with the market prices.

3) The need to ensure that, in order to control and guarantee the quality of the meat product obtained, each fish should be identified with a code that allows it to be monitored for quality throughout the productive process.

These three requirements are broadly met with the proposed system.

The invention object of the present specification relates to the fact that, in a cage or confinement structure with fish, two divers are introduced, the hunter armed with a rifle with modified harpoon, with one or two electrodes, equipped or not equipped with sensors and connected to equipment for transforming electrical potential, connected to a submerged plate.

The other diver, the controller, is the one who activates the switch of the equipment that sends an electrical signal that stuns or kills the fish to the plate and the tip of the harpoon. The fish is caught with a rope and pulled from the water by a crane and given a plastic identifying label. The rifle and harpoon are recovered and taken to the boat.

DESCRIPTION OF THE DRAWINGS

In order to complete the description that is being given and in order to facilitate a better and easier understanding of the characteristics of the invention, the present specification is accompanied, as an integral part thereof, with a set of drawings in which, by way of illustration and never limiting, the following has been represented.

PREFERRED EMBODIMENT OF THE INVENTION

Figure 1:
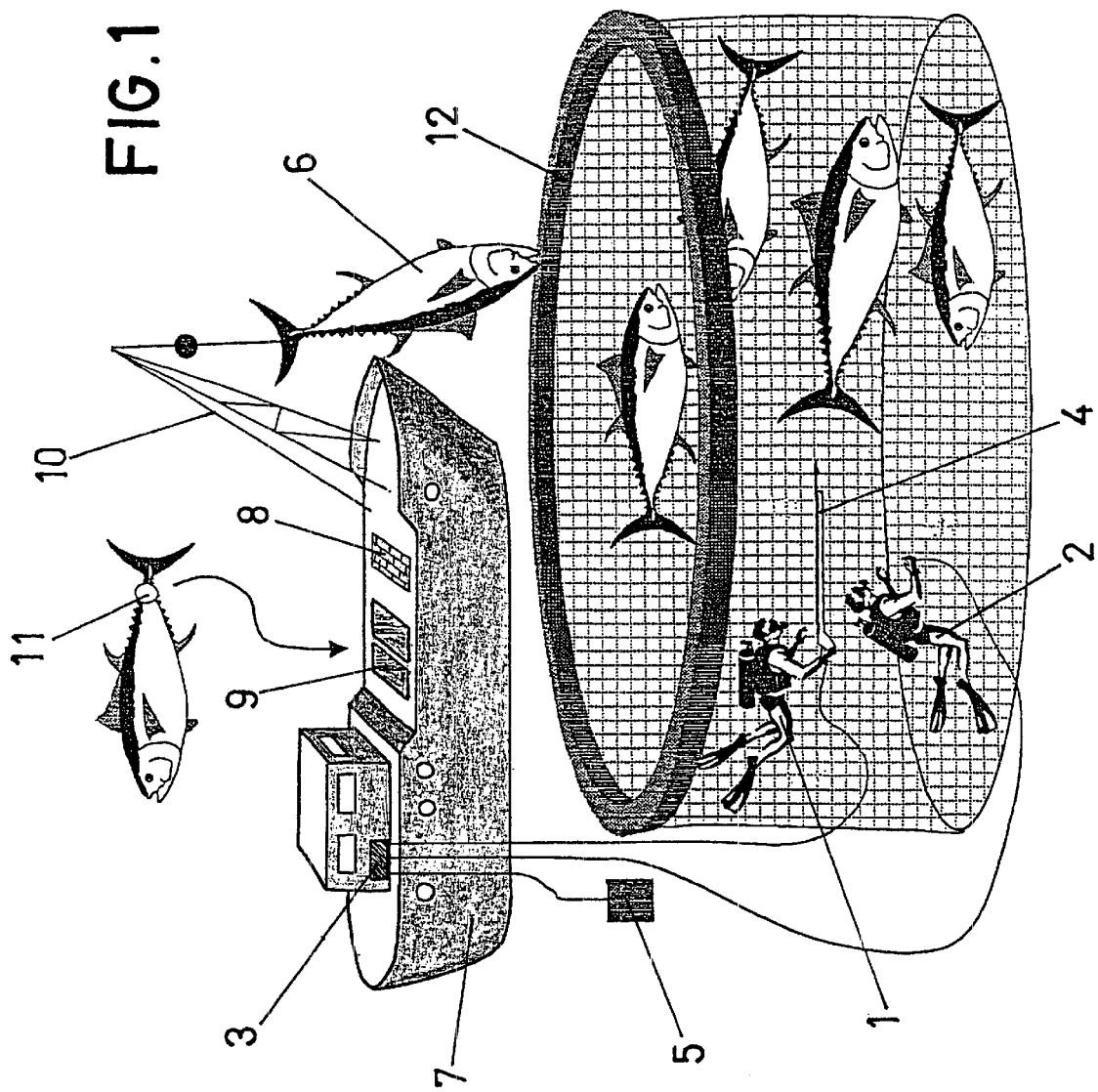
FIG. 1 shows, schematically, the general characteristics of the procedure of the invention that will now be described in its preferred form.

In view of that stated above, the present invention relates to a procedure for electro-stunning and/or electro-sacrifice, for industrial application to marine ichthyological species in floating cages, from among the group of all those means that use in different fields means of electro-stunning and/or electro-sacrifice of animal species.

For such purposes the procedure object of the patent put forward is organised, preferable as indicated in the only figure.

In a conventional cage (12) of standard size, where the tuna fish are to be found, two divers are introduced. The main diver or hunter (1) carries a submarine fish rifle equipped with a modified harpoon in which a Teflon head is mounted with a metallic tip (4), joined with a duly insulated cable to equipment for transforming electric power for applications of electro-sacrifice and electro-narcosis (3) located in the auxiliary boat (7). The other terminal of the electro-sacrifice equipment is found connected to a plate (5) that is located submerged alongside the floating cage.

The secondary diver or controller (2) has a switch that allows him to remotely control the operation of the electro-sacrifice system, while the controller (2) is swimming observing the operation alongside the hunter (1) such that, when the hunter has selected the fish to be sacrificed, basically, because he thinks that the fish selected complies with the suitable conditions for sacrifice, he shoots the rifle, thereby sinking the tip of the harpoon (4), connected to the electro-sacrifice equipment, into the fish. The controller (2) checks that the harpoon has found its target correctly and activates the electro-sacrifice equipment (3) using his switch, sending an electric signal to the two terminals (5) and (4) of a suitable size to stun the fish or at times, to even kill it.

As soon as this happens, the operation of the electro-stunning and/or electro-sacrifice equipment stops functioning, and the fish (6) is tied by the tail with a loop or slipknot and immediately recovered by a lifting crane located on the auxiliary boat (7). Once the fish is on the deck of the auxiliary boat (7) it is deposited on a space on the deck (8), where it is sacrificed by the normal methods (a quick stab and introduction of a metal band into the spinal chord) and then submitted to the necessary process (cutting the fins, bleeding, etc.).

At the same time the fish is equipped with a collar or plastic label (11) that contains its identification. This will accompany the fish throughout the whole production process to which it will be submitted in the later industrial processes on land (quartering room, freezing, preparation for exportation, etc).

When the process on deck has finished, the fish is stored in a hold (9) of the boat (7), where the fish that have already been sacrificed are stored in a mixture of water and ice or some other suitable storage system, until arriving at port.

While on the deck the described process is carried out, the rifle and harpoon used are recovered towards the auxiliary boat (7) where another auxiliary person substitutes the fired rifle for another loaded one to which the active tip (4) is attached. In this fashion the process proceeds without interruption, and high sacrifice rates can be reached.

This system of work does not necessarily require the bottom of the floating cage (12) to be raised, except in the case that it is desirable due to there being very few fishes in the cage, for a greater comfort for the divers and without the raising the stress levels of the fish.

In the normal working system, when the cage is not raised the fish are not forced to be retained in a small space, which reduces the stress to which they are submitted in conventional capture. This in turn leads to a greater quality of the fish meat product obtained.

At the crane (8) that lifts the stunned fish (6) an automatic system can additionally be connected that allows the weight of each fish to be measured as soon as it is placed on the deck of the support boat (7), and, on the plastic identifying label the weight of the fish can also be recorded and, in addition, any incidents that occurred during its sacrifice.

Alternatively, the plastic identifying label can be substituted by a barcode label, a readable remote transponder or an intelligent card, and also the active tip (4) joined to just one of the poles of the sacrifice system, can be substituted with another two-pole system. The operation can also be carried out from a surface boat, eliminating the hunter (1) and the controller (2), also using harpoons of both one and two electrodes.

Finally, harpoon tips can be introduced with sensors that only apply the electric signal when they detect that they are stuck in the tuna fish.

In the alternative case in which the equipment is used in land installations, the process that before was carried out on the boat is now carried out in a fixed installation or on a mobile platform that can move between the large aquariums.

In order to miniaturise the electrocution system and in order to be able to stop using cables, alternatively, two electrode tips can be used equipped with sensors and integrated switches, which work automatically. These tips would be loaded on land and equipped with safety measures, in order to allow a group of them to be carried by the divers in a suitable belt.

As an alternative to the rifles described, the divers can use reloadable rifles with a gas charge under the water, which allows the possibility of increasing the number of captures.

Variations in the order or arrangement of the elements comprising the procedure do not alter the essence of the invention. It is described in a non-limiting fashion, and the description is sufficient for an expert to reproduce the procedure.

What is claimed is:

1. A method for electro-stunning and/or electro-sacrificing for industrial application to marine ichthyological species in floating cages, comprising the steps of:

providing a floating cage and an auxiliary boat;

introducing two divers into the floating cage which is full of fish;

providing to one of the divers with a submarine fish rifle equipped with a modified harpoon in which a Teflon head is mounted with a tip, joined with a duly insulated cable to equipment for transforming electric power to applications of electro-sacrifice and electro-narcosis equipment;

providing to the other of the divers a switch that allows the other diver to remotely control the operation of the electro-sacrifice;

selecting the fish which complies with suitable conditions for sacrifice;

shooting the rifle;

sinking the tip of the harpoon into the fish;

checking that the harpoon has found its target;

activating the electro-sacrifice equipment using the switch, so an electrical signal is sent to the harpoon comprising a first terminal and a plate comprising a second terminal to stun or kill the fish;

stopping the operation of the electro-stunning and/or electro-sacrifice;

tying the fish by the tail with a loop or slipknot;

recovering the fish by a lifting crane located on the auxiliary boat;

equipping the fish with a collar or plastic identification label which accompanies the fish for the remaining conventional industrial production process on land;

depositing the fish on a space on a deck of the auxiliary boat;

sacrificing the fish;

submitting the fish for initial processing;

storing the fish in a hold of the boat in a mixture of water and ice;

recovering the rifle and harpoon when the process is carried out on the deck; and substituting the fired rifle for another loaded rifle where another tip is attached.

2. The method according to claim 1, characterized in that while one of the terminals of the electro-sacrifice equipment is joined to an equipment for transforming electrical potential, the other terminal of said equipment is joined to a plate submerged next to said floating cage.

3. The method according to claim 1, characterized in that the crane that lifts the stunned fish has an automatic weighing system attached, allowing the weight of each fish to be determined before it arrives on the deck.

4. The method according to claim 1 or 3, characterized in that the weight of the fish is recorded on the plastic identifying label of the fish.

5. The method according to claim 1, characterized in that the plastic label can be substituted for a barcode label.

6. The method according to claim 1, characterized in that the plastic label can be substituted for a remote readable transponder.

7. The method according to claim 1, characterized in that the plastic label can be substituted for an intelligent card.

8. The method according to claim 1, characterized in that the tip joined to just one of the poles of the sacrifice equipment is capable of being substituted with another tip joined to both poles so that the operation is further capable of being carried out from the boat on the surface without the two divers.

9. The method of claim 1, characterized in that the harpoon can be substituted with another harpoon having one or two poles.

10. The method according to claim 1, characterized in that the harpoon tips are equipped with sensors that only apply the electrical signal when they detect that the tip is stuck in the flesh of the fish.

11. The method according to claim 1, characterized in that the rifles comprise reloadable rifles usable under the water with gas.

12. The method according to claim 1, characterized in that the tip and the another tip can be equipped with sensors and integrated switches, which are capable of working automatically, being loaded on lands being equipped with safety systems, and being carried in groups by the divers in a suitable belt.

13. The method according to claim 1, characterized in that the method is carried out in a fixed installation.

14. The method according to claim 1, characterized in that the method is carried out on a mobile platform.

* * * * *